United States Patent [19]

Yoshida et al.

[11] Patent Number: 5,315,196
[45] Date of Patent: May 24, 1994

[54] SHAFT WITH GROOVES FOR DYNAMIC PRESSURE GENERATION AND MOTOR EMPLOYING THE SAME

[75] Inventors: Fumio Yoshida, Toride; Mikio Nakasugi, Chofu, both of Japan

[73] Assignee: Canon Kabushiki Kaisha, Tokyo, Japan

[21] Appl. No.: 924,926

[22] Filed: Aug. 5, 1992

[30] Foreign Application Priority Data

Aug. 8, 1991 [JP] Japan .................................. 3-223371
Aug. 8, 1991 [JP] Japan .................................. 3-223387

[51] Int. Cl.$^5$ ........................ H02K 5/16; F16C 32/06
[52] U.S. Cl. .................................. 310/90; 384/107
[58] Field of Search .................. 310/90; 29/898.02; 427/282, 286; 384/107, 113, 120, 115, 292, 398

[56] References Cited

U.S. PATENT DOCUMENTS

| | | |
|---|---|---|
| 4,487,514 | 12/1984 | Mori .................................. 384/113 |
| 4,547,081 | 10/1985 | Tanaka et al. ........................ 384/107 |
| 4,557,610 | 12/1985 | Asada et al. ......................... 384/107 |
| 5,097,164 | 3/1992 | Nakasugi et al. ..................... 310/88 |

FOREIGN PATENT DOCUMENTS

| | | | |
|---|---|---|---|
| 1905521 | 8/1970 | Fed. Rep. of Germany ........ | 310/90 |
| 60-56060 | 4/1985 | Japan .................................. | 310/90 |
| 61-124725 | 12/1986 | Japan .................................. | 427/282 |
| 62-1886 | 1/1987 | Japan .................................. | 310/90 |
| 63-199869 | 8/1988 | Japan .................................. | 310/90 |
| 64-39385 | 2/1989 | Japan .................................. | 310/90 |
| 1-116059 | 5/1989 | Japan .................................. | 310/90 |
| 2-256917 | 10/1990 | Japan .................................. | 310/90 |
| 2-256919 | 10/1990 | Japan .................................. | 310/90 |

*Primary Examiner*—Steven L. Stephan
*Assistant Examiner*—Matthew Nguyen
*Attorney, Agent, or Firm*—Fitzpatrick, Cella, Harper & Scinto

[57] ABSTRACT

A resist 4 is printed on the areas where the dynamic pressure generating grooves 2 are to be formed, on curved surface of a shaft core member 1a. After the resist 4 is hardened by baking, hard electroless plating is conducted to form a plated layer 3 of a thickness equal to the depth of the grooves 2. Then the resist 4 is removed to obtain a shaft 1 with dynamic pressure generating grooves 2. The dynamic pressure during rotation is free from fluctuation as the dynamic pressure generating grooves are highly precise and constant in the depth and in the cross-sectional shape.

3 Claims, 6 Drawing Sheets

5,315,196

SHAFT WITH GROOVES FOR DYNAMIC PRESSURE GENERATION AND MOTOR EMPLOYING THE SAME

BACKGROUND OF THE INVENTION

1. Field of the Invention

The present invention relates to a shaft with grooves for generating a dynamic pressure in a dynamic pressure fluid bearing adapted for use in a light deflecting device of a laser beam printer or the like. Also, the present invention relates to a motor with a dynamic pressure fluid bearing employing said shaft, adapted for use in a light deflecting device of a laser beam printer or the like.

2. Related Background Art

In such a light deflecting device, there has been employed a dynamic pressure fluid bearing for realizing non-contact rotation of the shaft in order to achieve a high precision in the device.

The shaft of such a dynamic pressure fluid bearing is provided with fine grooves for generating a dynamic pressure, and the working precision of said grooves is an important factor, governing the rotational reliability of the dynamic pressure fluid bearing. For forming said grooves, there have been proposed following methods.

A first method is to form the grooves for generating the dynamic pressure, by etching areas on curved surface of the shaft, not covered by a resist. FIG. 13 is a schematic cross-sectional view of a dynamic pressure generating groove formed by such etching, and an undercut 32a is formed on the internal wall, close to the aperture of a dynamic pressure generating groove 32, formed on the curved surface of the shaft 31.

A second method utilizes a rolling. As shown in FIG. 14, a dynamic pressure generating groove 42 formed by the rolling on a shaft 41 often shows a shoulder 42a at the aperture of said groove.

A third method is to form a film of a material capable of easily absorbing a laser beam on curved surface of a shaft member, and to form grooves for dynamic pressure generation by eliminating said film with a laser beam, as disclosed in the Japanese Patent Laid-Open Application No. 62-1886.

The prior art explained above has been associated with the following drawbacks.

Because of the undercut in the etching method and the shoulder in the rolling method, the grooves for dynamic pressure generation show complex cross-sectional shape, and fluctuate in the cross-sectional area along the longitudinal direction. For this reason, the dynamic pressure generated during rotation fluctuates, leading to an uneven revolution or vibration of the shaft. Also, the method utilizing the laser beam involves a high cost because of the complexity of the apparatus.

SUMMARY OF THE INVENTION

In consideration of the foregoing, an object of the present invention is to provide a shaft with dynamic pressure generating grooves which are constant and highly precise in the depth and in the cross-sectional shape along the longitudinal direction of the grooves, thereby avoiding fluctuation in the dynamic pressure generated during rotation.

A second object of the present invention is to provide a motor with dynamic pressure fluid bearings without fluctuation in the dynamic pressure generated during rotation, thereby avoiding fluctuation in revolution or vibration of the shaft.

To achieve the above-mentioned objects the present invention is characterized by a shaft with grooves for generating a dynamic pressure comprising a shaft core member of a radius determined by subtracting a radius of the shaft from a depth of the grooves, and a plated layer of a thickness equal to the depth of the grooves and formed on areas other than areas of the grooves.

The plated layer is preferably formed by electroless plating.

The depth, the cross-sectional shape and the cross-sectional area of the grooves formed on the shaft are constant in any position along the longitudinal direction of the grooves, therefore, a highly precise shaft can be produced with ease.

Also, the durability of the shaft can be improved when the plated layer is formed by hard electroless plating.

DESCRIPTION OF THE PREFERRED EMBODIMENTS

Now the present invention will be clarified in detail by embodiments shown in the attached drawings.

FIGS. 1 to 5 illustrate steps for producing a shaft of the present invention.

Figure 1:
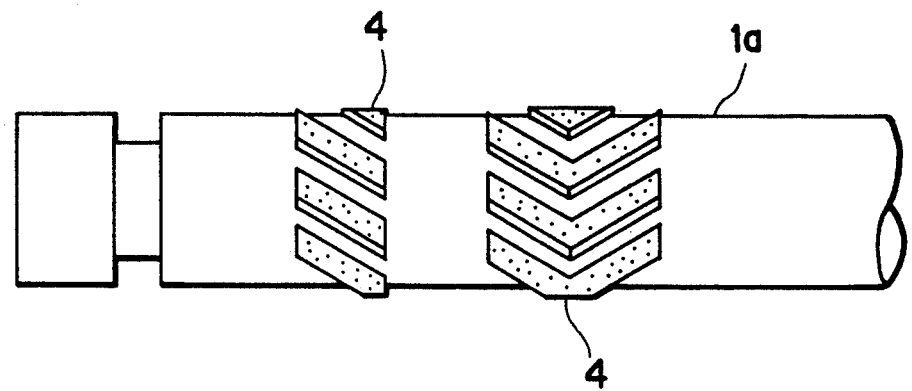
FIG. 1 is a schematic partial plan view, showing a step of the method for producing the shaft of the present invention, in a state in which a resist is printed on a shaft core member.
Figure 3:
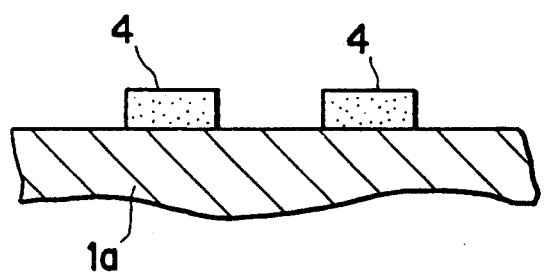
FIG. 3 is a schematic cross-sectional view showing a step of the method for producing the shaft of the present invention, in a state in which a resist is printed on a shaft core member.
Figure 4:
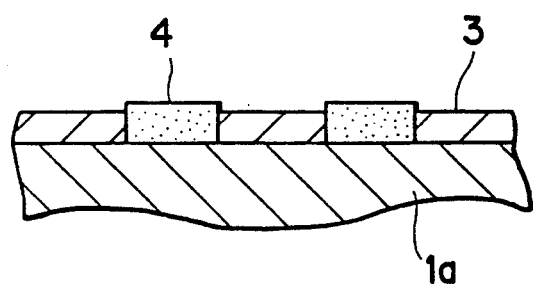
FIG. 4 is a schematic cross-sectional view showing a step of the method for producing the shaft of the present invention, in a state in which a plated layer is formed on the shaft core member.
Figure 5:
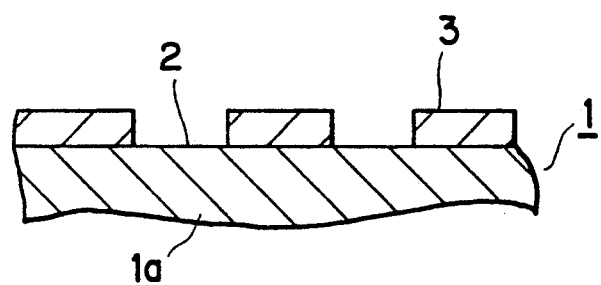
FIG. 5 is a schematic cross-sectional view of a first embodiment of the present invention, illustrating the shape of grooves when the plated layer is formed by hard electroless plating.

A shaft core member 1a of stainless steel is manufactured by cutting or the like in advance. The radius of the shaft core member 1a is determined by subtracting the radius of the completed shaft 1 from the depth of a groove 3, as shown in FIGS. 1, 3 and 5. A resist 4 is printed on areas which will constitute the grooves for dynamic pressure generation on the curved surface of said shaft core member 1a.

Figure 2:
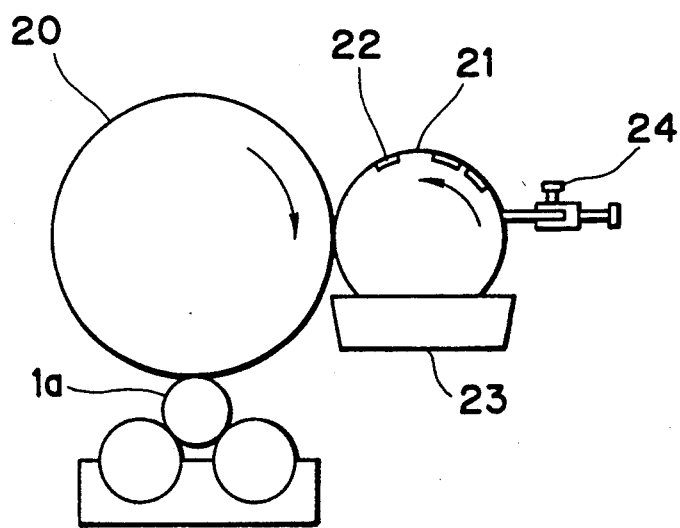
FIG. 2 is a schematic lateral view showing a step of the method for producing the shaft of the present invention, and illustrating a gravure offset printing machine for printing the resist.

Said printing can be achieved advantageously, for example, by a gravure offset printing machine shown in FIG. 2. The resist 4 supplied from a resist supply unit 23 equipped with a doctor blade 24 to recessed patterns 22 of a gravure roller 21, is transferred onto an offset roller 20 and is printed on the curved surface of the shaft core member 1a.

After the printed resist 4 is hardened by baking, there are conducted ordinary steps of rinsing, surface activation and nickel striking, and then hard electroless plating is conducted to form a plated layer 3 of a thickness same as the depth of said groove 2.

After rinsing and drying, said resist 4 is removed to form said groove 2.

In the following there will be explained a second embodiment of the present invention.

Figure 6:
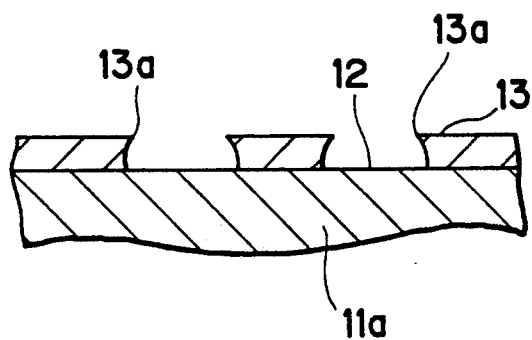
FIG. 6 is a schematic cross-sectional view of a second embodiment of the present invention, illustrating the shape of grooves when the plated layer is formed by electrolytic plating.

FIG. 6 is a schematic cross-sectional view showing the cross-sectional shape of dynamic pressure generating grooves formed by electrolytic plating, instead of the hard electroless plating in the first embodiment. In the present embodiment, at the edges of the apertures of the dynamic pressure generating groove 12, there are formed projections 13a, which have to be removed by a post-working. Other steps can be same as those in the first embodiment.

EXAMPLE

A stainless steel shaft core member of a diameter of 3.99 mm was prepared and degreased with alkaline solution, and then a resist was printed with a thickness of at least 5 μm on areas where the grooves are to be formed, on the curved surface of said shaft core member.

Said resist material was advantageously composed of epoxy ink or ceramic ink (Printon: trade name) in consideration of the printability, resistance to acids and alkalis, adhesion to the shaft core member and easiness of removal after plating.

After the printed resist was hardened by baking, there were conducted steps of alkali washing, surface activation with hydrochloric acid and nickel striking, and then hard electroless plating of cobalt-phosphor alloy was conducted for 30 minutes (pH 9.2, 90° C.) to form a plated layer of a thickness of 5±0.5 μm.

In the above-explained example, the nickel striking was conducted because the shaft core member was made of stainless steel, but it is not necessary in a case where the shaft core member is made of another material such as carbon steel.

The electroless plating of cobalt-phosphor alloy may also be replaced by that of nickel-tungsten-boron alloy (pH 6.5, 65° C., 60 min.) or nickel-boron alloy (pH 6.5, 65° C., 60 min.).

The present invention, explained in the foregoing, can provide following advantages.

Since the dynamic pressure generating grooves are constant and highly precise in the cross-sectional shape and the area in any position along the longitudinal direction thereof, no fluctuation in the dynamic pressure is produced upon rotation, so that no fluctuation in revolution or vibration is produced. Also, the manufacturing cost can be lowered as the depth of the grooves can be optionally selected by the regulation of the thickness of the plated layer, and also as said plated layer can be composed of a material softer than that of the shaft core member to facilitate mechanical working.

In the following there will be explained, with reference to FIGS. 7 to 12, a motor employing a shaft with dynamic pressure generating grooves formed by the above-explained method.

Figure 7:
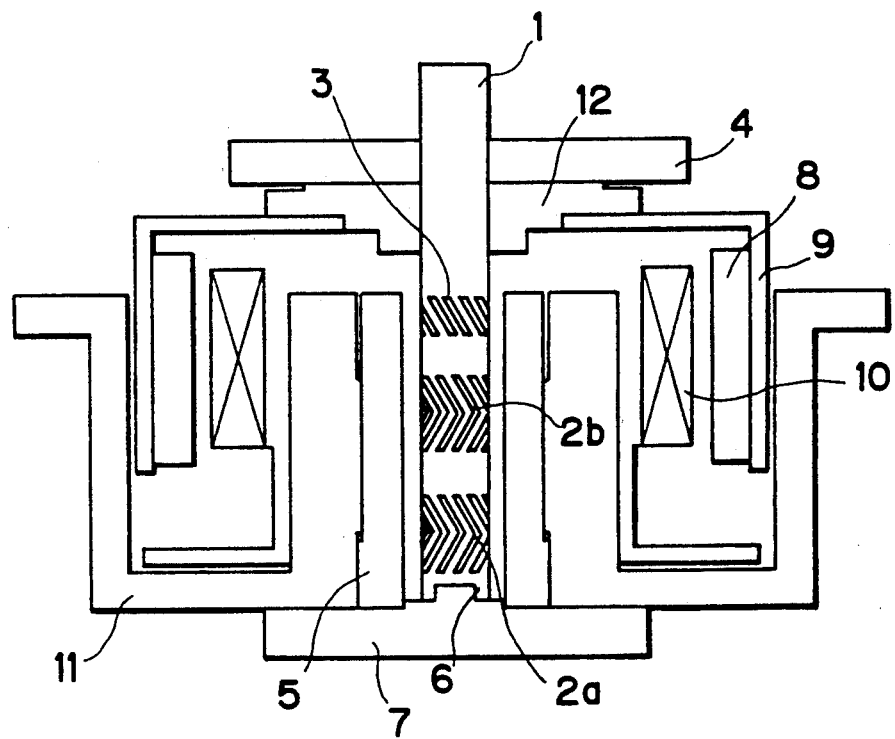
FIG. 7 is a schematic longitudinal cross-sectional view of a first embodiment of the present invention.

Referring to FIG. 7, a sleeve 5 is fitted into a boss of an outer tube 11, and a shaft 1 is rotatably fitted into said sleeve 5. In the internal lower end of said sleeve 5 there is provided a thrust plate 6 supported by a fixed plate 7, which is fixed on the lower face of the outer tube 1. On the upper end portion of the shaft 1 there is fitted a flange 12. A rotary polygon mirror 4 is provided on the flange 12 to rotate together with the shaft 1. A yoke 9 supporting a driving magnet 8 is fixed in the curved surface position on the lower face of said flange 12, and a stator 10 is fixed on a boss of the outer tube 11 in opposed relationship to said driving magnets 8.

On the curved surface of the shaft 1, there are provided first dynamic pressure generating grooves 2a, second dynamic pressure generating grooves 2b and spiral grooves 3 for guiding lubricating liquid, with appropriate spacings therebetween in succession from the lower end. Also, on a face of said thrust plate 6, opposed to the lower end face of the shaft 1, there are provided grooves (not shown) for constituting a dynamic pressure thrust bearing.

The above-mentioned first and second dynamic pressure generating grooves 2a, 2b are constructed in the following manner.

FIGS. 8 to 12 illustrate steps for producing the shaft 1 of the present embodiment.

Figure 8:
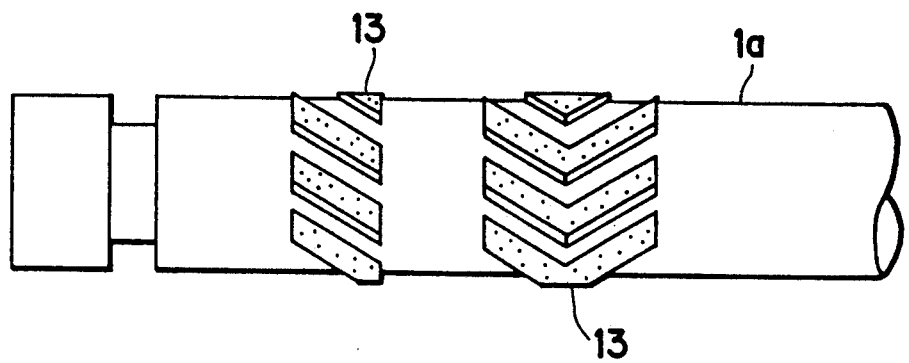
FIG. 8 is a schematic view illustrating a producing step of a shaft employed in the first embodiment.

FIG. 8 best illustrates the method of producing of said shaft 1. At first there is prepared a shaft core member 1a of a radius which is determined by subtracting the radius of the shaft 1 from the depth of the dynamic pressure generating grooves 2a, 2b and the grooves 3. A resist 13 for preventing the deposition of the plated layer is coated on areas where said dynamic pressure generating grooves 2a, 2b and grooves 3 are to be formed on said shaft core member 1a with a thickness corresponding to the depth of said grooves. This step will be explained in more detail in the following.

Figure 9:
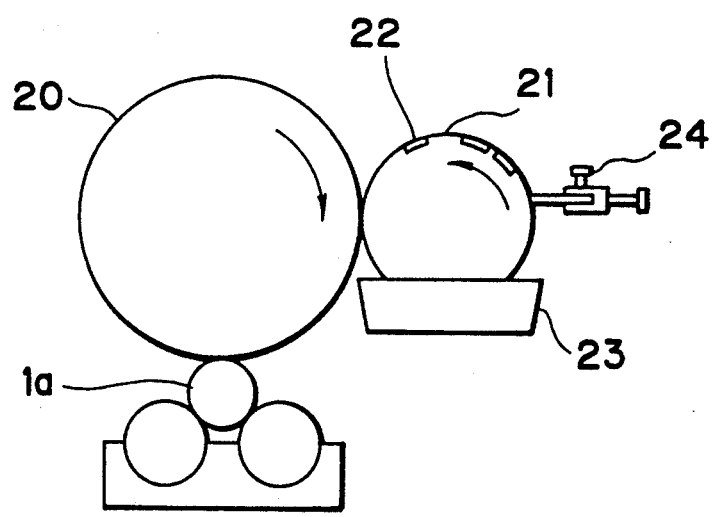
FIG. 9 is a schematic lateral view of a gravure offset printing machine used for printing the resist, as a step for producing the shaft employed in said embodiment.
Figure 10:
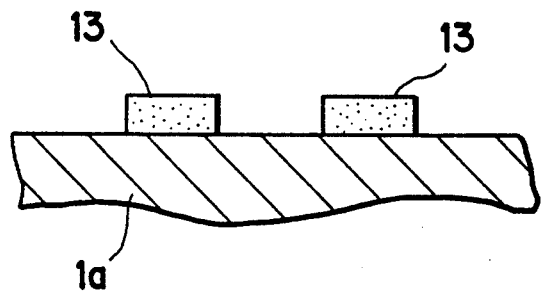
FIG. 10 is a schematic cross-sectional view showing a state in which the resist is printed on the external periphery of a shaft core member, as a step for producing the shaft employed in the embodiment shown in FIG. 7.

FIG. 9 is a schematic lateral view of a gravure offset printing machine used for printing the resist 13 onto the shaft core member 1a. The resist supplied from an ink supply unit 23 equipped with a doctor blade 24 to recessed patterns 22 of a gravure roller 21, is transferred onto an offset roller 20 and is printed onto the curved surface of the shaft core member 1a. FIG. 10 shows a state in which the resist 13 of a thickness at least equal to the depth of said grooves is printed onto the curved surface of the shaft core member 1a.

Figure 11:
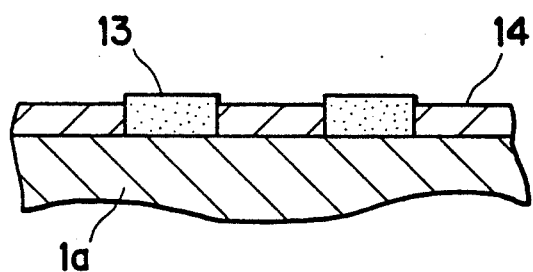
FIG. 11 is a schematic cross-sectional view showing a state in which a plated layer is formed on the shaft core member, as a step for producing the shaft employed in said embodiment.

After the resist is hardened by baking, plating is conducted to form a plated layer 14 as shown in FIG. 11.

Figure 12:
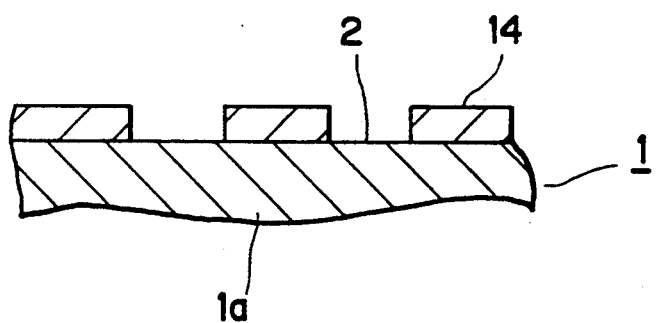
FIG. 12 is a schematic cross-sectional view showing a state in which the plated layer 14 is left by removal of the resist material, as a step for producing the shaft employed in said embodiment.
Figure 13:
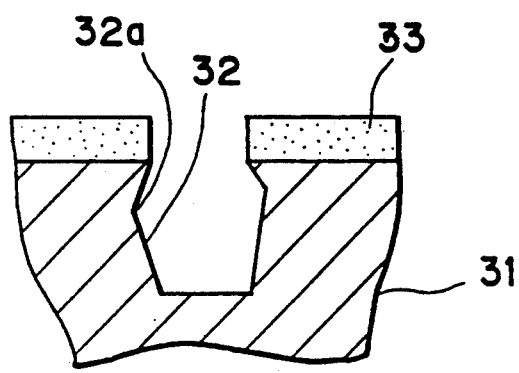
FIG. 13 is a schematic cross-sectional view of dynamic pressure generating grooves formed by etching.
Figure 14:
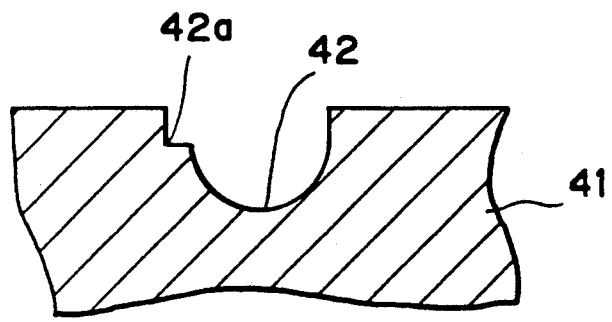
FIG. 14 is a schematic cross-sectional view of dynamic pressure generating grooves formed by rolling.

After said plated layer 14 is formed with a thickness corresponding to the depth of the grooves, the resist 13 is removed as shown in FIG. 12 to leave the plated layer 14, thereby manufacturing the shaft 1.

In the above-explained first embodiment, in the preparation of the shaft core member of a radius subtracting the radius of the shaft from the depth of the grooves, said shaft core member is preferably finished with a surface roughness substantially same as that of the plated layer 14, whereby the completed shaft has a substantially same surface roughness on the shaft surface and the bottom of the grooves, thereby further improving the reliability of rotation.

The shaft of the present invention, being constructed as explained above, provides following advantages.

The dynamic pressure generating grooves have an accurate rectangular cross-sectional shape and are precisely constant in cross-sectional area in any position along the longitudinal direction. Consequently the dynamic pressure in the rotation is constant during rotation, so that the shaft is free from fluctuation in revolution or vibration. Thus, the motor with the dynamic pressure fluid bearings provides improved reliability of rotation.

What is claimed is:

1. A shaft with grooves for generating dynamic pressure, comprising a shaft core member and a plated layer formed on the shaft core member in areas other than areas of said grooves, said plated layer having a thickness equal to the depth of said grooves and having a roughness substantially the same as a bottom of said grooves, the thickness of said plated layer being at least 5 $\mu$m.

2. A shaft with grooves for generating a dynamic pressure according to claim 1, wherein said plated layer is formed by hard electroless plating.

3. A motor with a dynamic pressure fluid bearing having a shaft comprising grooves for generating dynamic pressure, wherein said dynamic pressure generating grooves are formed on a shaft core member by providing a coating for preventing a plating deposition on areas where said dynamic pressure generating grooves are to be formed, then forming a plated layer, and removing said coating, and wherein a roughness of a surface of the plated layer is substantially the same as that of a bottom of said dynamic pressure generating grooves, the thickness of said plated layer being at least 5 $\mu$m.

* * * * *